(12) United States Patent
Li et al.

(10) Patent No.: US 10,331,933 B2
(45) Date of Patent: Jun. 25, 2019

(54) OLED PANEL, TERMINAL AND METHOD FOR CONTROLLING IDENTIFICATION

(71) Applicant: Xiaomi Inc., Beijing (CN)

(72) Inventors: Guosheng Li, Beijing (CN); Xiaoxing Yang, Beijing (CN); Shanrong Liu, Beijing (CN)

(73) Assignee: XIAOMI INC., Beijing, P.R. (CN)

( * ) Notice: Subject to any disclaimer, the term of this patent is extended or adjusted under 35 U.S.C. 154(b) by 159 days.

(21) Appl. No.: 15/347,947

(22) Filed: Nov. 10, 2016

(65) Prior Publication Data

US 2017/0140197 A1    May 18, 2017

(30) Foreign Application Priority Data

Nov. 13, 2015    (CN) .......................... 2015 1 0781251

(51) Int. Cl.
| | |
|---|---|
| *G06K 9/00* | (2006.01) |
| *G09G 3/3225* | (2016.01) |
| *G06F 21/32* | (2013.01) |
| *H01L 27/32* | (2006.01) |

(Continued)

(52) U.S. Cl.
CPC ........... *G06K 9/0002* (2013.01); *G06F 21/32* (2013.01); *G06F 21/81* (2013.01); *G06F 21/84* (2013.01); *G09G 3/3225* (2013.01); *H01L 27/3225* (2013.01); *G09G 2300/04* (2013.01); *G09G 2300/0426* (2013.01); *G09G 2300/0861* (2013.01); *G09G 2310/08* (2013.01);
(Continued)

(58) Field of Classification Search
CPC ..... G06F 21/32; G06F 3/041; G06K 9/00006; G06K 9/0002; G09G 2300/04; G09G 2300/0426; G09G 2300/0861; G09G 2310/08; G09G 2320/0295; G09G 2354/00; G09G 2358/00; G09G 3/3225; H01L 27/3225
See application file for complete search history.

(56) References Cited

U.S. PATENT DOCUMENTS

| | | |
|---|---|---|
| 2005/0200293 A1 | 9/2005 | Naugler, Jr. et al. |
| 2014/0036168 A1 | 2/2014 | Ludwig |
| 2014/0300574 A1 | 10/2014 | Benkley, III et al. |

(Continued)

FOREIGN PATENT DOCUMENTS

| | | |
|---|---|---|
| CN | 1922470 A | 2/2007 |
| CN | 104112120 A | 10/2014 |

(Continued)

OTHER PUBLICATIONS

Extended European Search Report dated Mar. 24, 2017 for European Application No. 16198725.0, 10 pages.

(Continued)

*Primary Examiner* — Nirav G Patel

(74) *Attorney, Agent, or Firm* — Brinks Gilson & Lione

(57) ABSTRACT

The present disclosure provides an OLED panel, a mobile device and a method for controlling identification, and belongs to the field of display technology. The OLED panel includes an array substrate, an OLED layer disposed on the array substrate, a fingerprint collecting unit array disposed in the array substrate, or a fingerprint collecting unit array disposed between the array substrate and the OLED layer, and a control circuit connected to the fingerprint collecting unit array.

4 Claims, 12 Drawing Sheets

(51) Int. Cl.
*G06F 21/81* (2013.01)
*G06F 21/84* (2013.01)

(52) U.S. Cl.
CPC . *G09G 2320/0295* (2013.01); *G09G 2354/00* (2013.01); *G09G 2358/00* (2013.01)

(56) References Cited

U.S. PATENT DOCUMENTS

| | | | |
|---|---|---|---|
| 2014/0355376 | A1 | 12/2014 | Schneider et al. |
| 2015/0070320 | A1 | 3/2015 | Hong et al. |
| 2015/0331508 | A1* | 11/2015 | Nho ............... G06F 3/0421 345/173 |

FOREIGN PATENT DOCUMENTS

| | | | |
|---|---|---|---|
| CN | 104155785 | A | 11/2014 |
| CN | 104282265 | A | 1/2015 |
| CN | 104318205 | A | 1/2015 |
| CN | 104778923 | A | 7/2015 |
| CN | 104898322 | A | 9/2015 |
| CN | 105047689 | A | 11/2015 |
| JP | 2007-535728 | A | 12/2007 |
| RU | 2 411 580 | C2 | 2/2011 |
| RU | 2 435 194 | C2 | 11/2011 |
| WO | WO 2014/197347 | A1 | 12/2014 |
| WO | WO 2015-100371 | A1 | 7/2015 |

OTHER PUBLICATIONS

International Search Report and Written Opinion dated Jul. 21, 2016 for International Application No. PCT/CN2015/099041, 14 pages.
Office Action dated Jan. 9, 2018 for Japanese Application No. 2016-531680, 4 pages.
Office Action dated Nov. 17, 2017 for Russian Application No. 2016140732/08, 7 pages.
Office Action dated Jun. 19, 2018 for Chinese Application No. 201510781251.2, 10 pages.
Summons to Attend Oral Proceedings dated Jul. 26, 2018 for European Application No. 16198725.0, 10 pages.

* cited by examiner

OLED PANEL, TERMINAL AND METHOD FOR CONTROLLING IDENTIFICATION

CROSS-REFERENCE TO RELATED APPLICATIONS

This application claims priority to Chinese Patent Application Serial No. 201510781251.2, filed on Nov. 13, 2015, the entirety of which is hereby incorporated by reference herein.

TECHNICAL FIELD

The present disclosure relates to the field of display technology, and more particularly to an organic light emitting display (OLED) panel, a device, and a method for controlling identification based on a fingerprint detection.

BACKGROUND

A fingerprint identifying module may be used for collecting a fingerprint image.

In the related art, the fingerprint identifying module may be generally disposed in a physical button of a mobile device to detect a user's fingerprint and determine the user's identification based on the detected fingerprint.

SUMMARY

According to an embodiment of the present disclosure, there is provided an organic light emitting display (OLED) panel. The OLED panel may include an array substrate, an OLED layer disposed on the array substrate, a fingerprint collecting unit array disposed in the array substrate, or a fingerprint collecting unit array disposed between the array substrate and the OLED layer, and a control circuit connected to the fingerprint collecting unit array.

According to another embodiment of the present disclosure, there is provided a terminal. The terminal may include an OLED panel, where the OLED panel may include an array substrate, an OLED layer disposed on the array substrate, a fingerprint collecting unit array disposed in the array substrate, or a fingerprint collecting unit array disposed between the array substrate and the OLED layer, and a control circuit connected to the fingerprint collecting unit array.

According to another aspect of the present disclosure, there is provided a method for controlling identification, for use in a fingerprint collecting control unit connected to an organic light emitting display (OLED) panel, where the OLED panel may include an array substrate, an OLED layer disposed on the array substrate, a fingerprint collecting unit array disposed in the array substrate, or a fingerprint collecting unit array disposed between the array substrate and the OLED layer, and a control circuit connected to the fingerprint collecting unit array. The method may include sending an enabling signal to a control line in the $i^{th}$ row, for controlling a fingerprint collecting unit in the $i^{th}$ row to communicate with a data line, obtaining a fingerprint signal collected by the fingerprint collecting units in the $i^{th}$ row via the data line, setting i=i+1 and resending the enabling signal to the control line in the $i+1^{th}$ row in the case that i is less than b, setting i=1 and resending the enabling signal to the control line in the $i^{th}$ row in the case that i equals to b.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

The popularity of mobile computing devices can be traced in part to the many advantageous benefits offered for their users. For example, users are able to communicate with others through communication networks that may be accessed by their mobile computing device. Exemplary mobile computing devices include, but are not limited to, smartphone devices, tablet computing devices, wearable computing devices, laptop computing devices, and the like.

Some of these advantageous benefits may be directly related to a touch screen display of the mobile computing device. For example, a security function offered by a mobile device including a touch screen display may include a fingerprint identification feature that may only unlock certain features of the mobile device after authenticating a user's fingerprint. It follows that the present disclosure describes a touch screen panel for installation on a mobile device, where the mobile device also includes a fingerprint collecting unit that controls operation of the touch screen panel and the mobile device to ensure a fingerprint identification feature may be implemented along with display features on the same touch screen panel.

Figure 1:
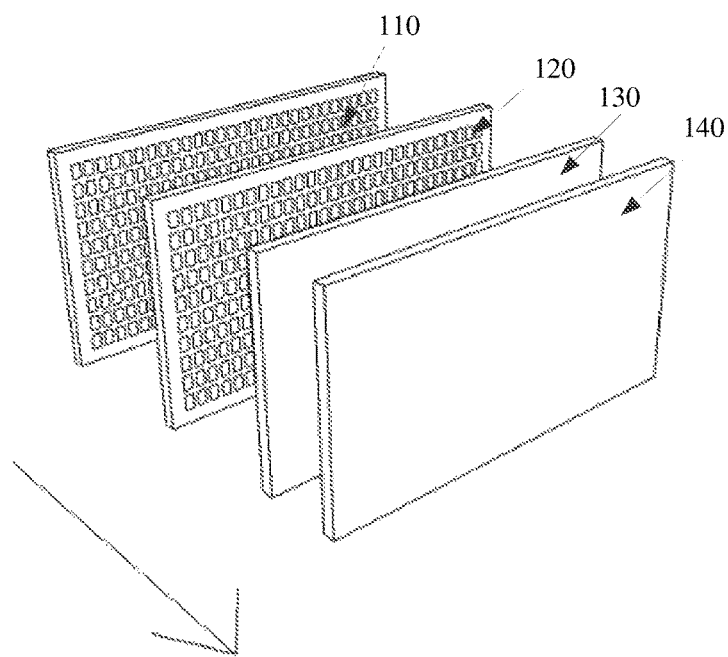
FIG. 1 shows a schematic diagram of an OLED panel in the related art.

FIG. 1 shows a schematic diagram of an exemplary organic light emitting display (OLED) panel that may be used as a touch screen panel.

As shown in FIG. 1, an exemplary OLED panel 100 includes an array substrate 110, an OLED layer 120, a glass substrate 130 and a polarizer 140.

The OLED layer 120 is disposed on the array substrate 110, the glass substrate 130 is disposed on the OLED layer and the polarizer 140 is disposed on the glass substrate 130.

The OLED layer 120 includes m×n pixel units. Each pixel unit may include K pixel sub-units. In general, each pixel unit in the OLED layer 120 may include three pixel sub-units. For example, the three pixel sub-units may include a red (R) pixel sub-unit, a green (G) pixel sub-unit and a blue (B) pixel sub-unit. In some embodiments, each pixel unit may include four pixel sub-units, which may include a red (R) pixel sub-unit, a green (G) pixel sub-unit, a blue (B) pixel sub-unit and a white (W) pixel sub-unit. It follows that the number K may be three or four.

Correspondingly, the array substrate 110 may also include m×n pixel units, corresponding to the m×n pixel units in the OLED layer 120. Each pixel units in the array substrate 110 may also include K pixel sub-units, where K may be three or four.

Figure 2:
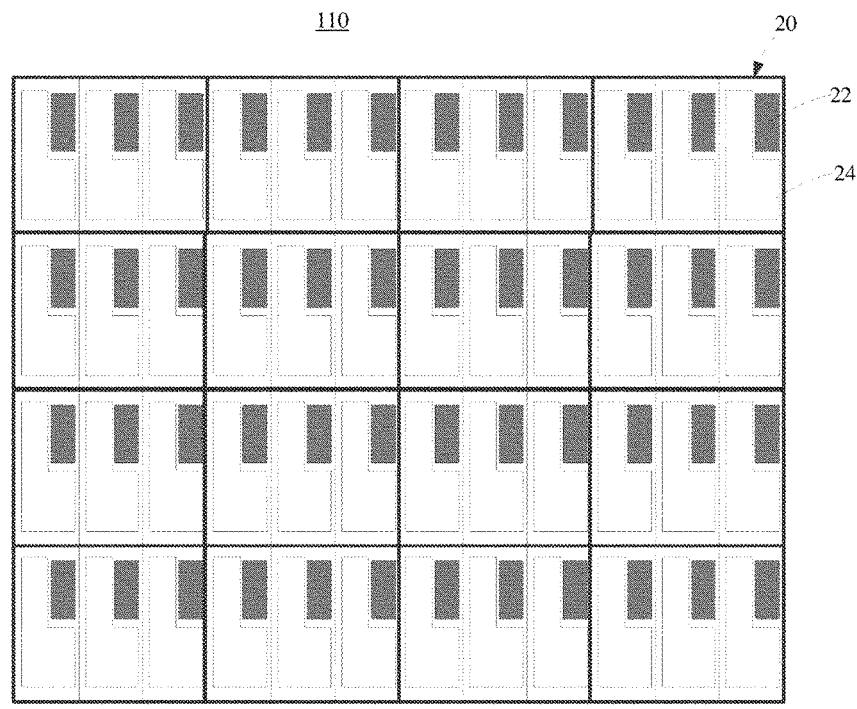
FIG. 2 shows a schematic diagram of an array substrate including an arrangement of pixel units.

FIG. 2 shows an exemplary schematic diagram of an arrangement of pixel units that may be arranged in the array substrate 110. As shown in FIG. 2, the array substrate 110 may include 4×4 pixel units, i.e., 16 total pixel units 20, where each pixel unit includes three pixel sub-units 21. Each pixel sub-unit 21 may include a thin film transistor (TFT) region 22 and a non-TFT region 24.

It should be noted that the exemplary schematic diagram shown in FIG. 2 may be a partial region of the array substrate 110, i.e., the array substrate 110 in its entirety may consist of a plurality of regions as shown in FIG. 2.

The polarizer 140 may be attached to the glass substrate 130.

The array substrate 110 provides the OLED layer 120 with an electric field, under which an organic semiconductor material and a light emitting material may be driven to emit light, such that the emitted light passes through the glass substrate 130 and the polarizer 140 successively from bottom to top, thereby displaying an image. The arrow shown in FIG. 1 may be representative of a direction in which the emitted light is projected.

Figure 3A:
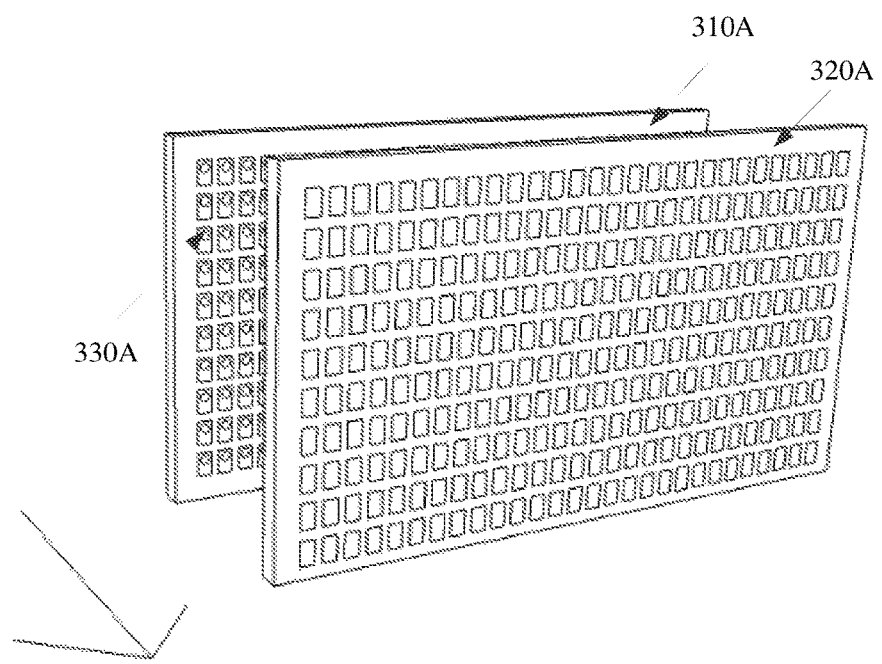
FIG. 3A shows a schematic diagram showing an OLED panel according to an illustrative embodiment of the present disclosure.

FIG. 3A is a schematic diagram showing an OLED panel according to an illustrative embodiment of the present disclosure. The OLED panel may be used as part of a mobile device such as a mobile phone, a tablet computer, a laptop computer, wearable device, or other mobile computing device. As shown in FIG. 3A, the exemplary OLED panel 300 includes an array substrate 310A, an OLED layer 320A disposed on the array substrate 310A, a fingerprint collecting unit array 330A disposed in the array substrate 310A, and a control circuit (not shown) connected to the fingerprint collecting unit array 330A. A fingerprint collecting unit may include a combination of hardware in the form of touch input sensors, as well as software in the form of fingerprint recognition and acquisition applications. The fingerprint collecting unit array 330A is disposed within the array substrate 310A so that the plurality of sensors that comprise the fingerprint collecting unit connects are able to sense/measure the signal distribution of the whole sensor matrix to detect the formation of the fingerprint image.

Alternatively, a glass substrate and a polarizer (not shown) may be disposed on the OLED layer 320A successively, as shown in the exemplary OLED panel 100 in FIG. 1.

According to the OLED panel 300, the fingerprint collecting unit array 330A may be disposed in the array substrate 310A of the OLED panel 300, so as to dispose the fingerprint identifying module inside the mobile device in a non-separated way, so that a fingerprint identifying function is integrated into the OLED panel 300, such that the OLED panel 300 may implement both a displaying function and the fingerprint identifying function at the same time with the same OLED panel 300, thereby enhancing integral consistency and aesthetics of the mobile device.

Figure 3B:
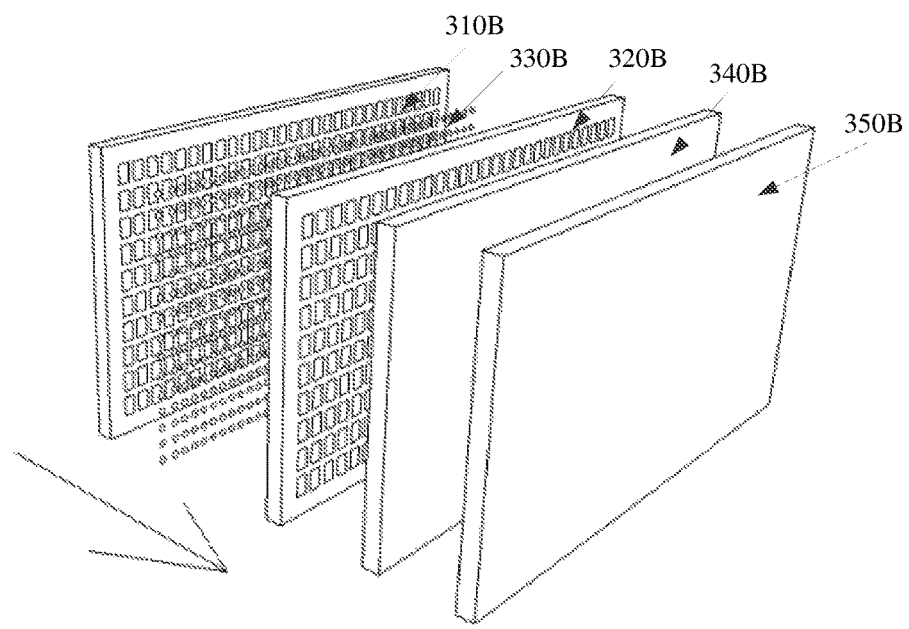
FIG. 3B shows a schematic diagram of an OLED panel according to another illustrative embodiment of the present disclosure.

FIG. 3B shows a schematic diagram of another exemplary OLED panel 360 according to another illustrative embodiment of the present disclosure. The OLED panel 360 may also be used as part of a mobile device. As shown in FIG. 3B, the OLED panel 360 may include an array substrate 310B, an OLED layer 320B disposed on the array substrate 310B, a fingerprint collecting unit array 330B disposed between the array substrate 310B and the OLED layer 320B, and a control circuit (not shown) connected to the fingerprint collecting unit array 330B.

Alternatively, a glass substrate 340B and a polarizer 350B may be disposed on the OLED layer 320B successively.

According to the OLED panel 360, the fingerprint collecting unit array 330B may be disposed between the array substrate 310B and the OLED layer 320B, so as to dispose the fingerprint identifying module inside the mobile device in a non-separated way, so that the fingerprint identifying function is integrated into the OLED panel 360, such that the OLED panel 360 of the mobile device may implement both the displaying function and the fingerprint identifying function at the same time with the same OLED panel 360, thereby enhancing integral consistency and aesthetics of the mobile device. The OLED panel 360 is able to achieve the simultaneous display and fingerprint identifying function due, at least in part, to the OLED panel's 360 self-luminous characteristic that does not require a separate backlight. In contrast, other display technologies such as LCDs require a separate backlight module to provide the light emissions that provide the displaying function.

According to some embodiments of the OLED panel 300 shown in FIG. 3A, the fingerprint collecting unit array 330A may include a×b fingerprint collecting units. Each fingerprint collecting unit may correspond to one pixel sub-unit in the array substrate 310A, in which $a \leq K \times m$ and $b \leq n$. In a front view of the OLED panel 300, each fingerprint collecting unit may be a cross-section area less than an area occupied by one pixel sub-unit. During a fingerprint collecting function implemented by the fingerprint collecting unit array 330A, each fingerprint collecting unit may be used to collect a fingerprint image for one pixel sub-unit.

According to some embodiments, the number of fingerprint collecting units included in an OLED panel of the present disclosure may be equal to the number of the pixel sub-units in the array substrate, i.e., $a = K \times m$ and $b = n$.

According to some embodiments, the number of fingerprint collecting units included in an OLED panel of the present disclosure may be less than the number of the pixel sub-units in the array substrate, i.e., a<K×m and b<n; or a<K×m and b=n; or a=K×m and b<n.

The location of fingerprint collecting units on their respective OLED panel may be based on the number of fingerprinting collecting units included on their respective OLED panel. According to a first example, the fingerprint collecting units in a fingerprint collecting unit array of an OLED panel of the present disclosure may correspond to the pixel sub-units in the array substrate in an one-to-one manner, in which a=K×m and b=n, i.e., each pixel sub-unit corresponds to one fingerprint collecting unit.

Alternatively, a location in which at least one fingerprint collecting unit is disposed in an OLED panel of the present disclosure may coincide with (e.g., overlap) a non-TFT region in a corresponding pixel sub-unit.

In view of the different available sizes of a fingerprint collecting unit that may be included in an OLED panel of the present disclosure and circuitry for connecting the fingerprint collecting unit thereto, the location at which the fingerprint collecting unit is disposed may coincide with the non-TFT region in the corresponding pixel sub-unit. In some embodiments, the location at which the fingerprint collecting unit is disposed may coincide with the TFT region in the corresponding pixel sub-unit.

Figure 4A:
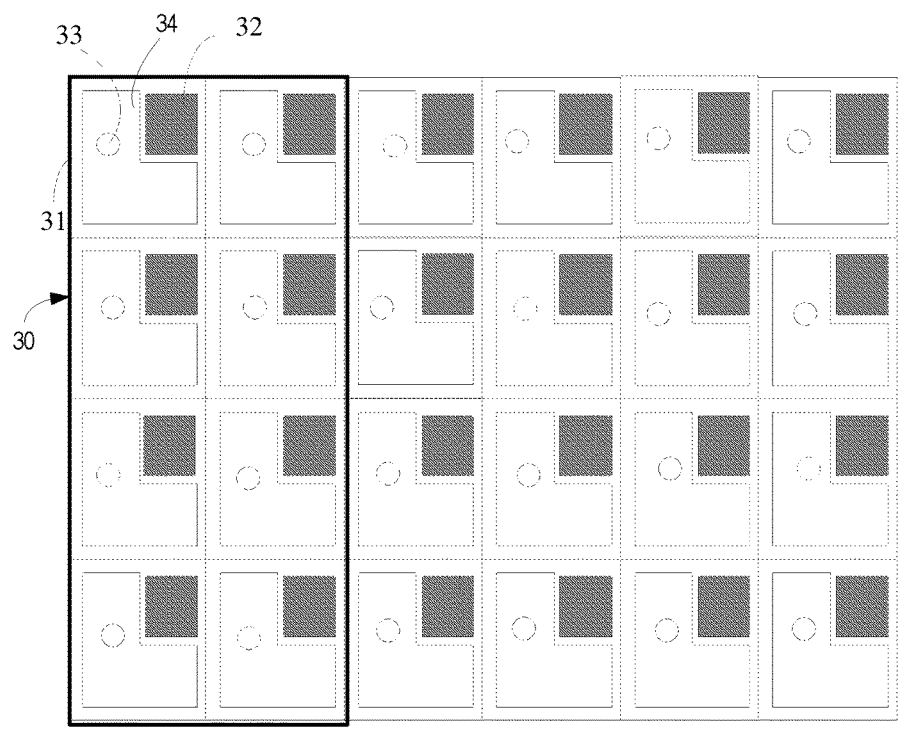
FIG. 4A shows a schematic diagram of an array substrate including a fingerprint collecting unit according to an illustrative embodiment of the present disclosure.

According to embodiments of the first example, the fingerprint collecting unit array may be disposed in an array substrate 410, as shown in FIG. 4A. The array substrate 410 includes 2×4 pixel units 30, i.e., including 24 (8×3) pixel sub-units 31. The array substrate 410 further includes 6×4 fingerprint collecting units 33, i.e., including 24 total fingerprint collecting units 33. The non-TFT region 34 of each pixel sub-unit 31 may be provided with one corresponding fingerprint collecting unit 33. The non-TFT region 34 may be distinguishable from the TFT region 34 in each pixel sub-unit 31.

According to a second example, the fingerprint collecting unit array of an OLED panel of the present disclosure may be disposed within a partial region of an array substrate (e.g., the partial region may be less than the entirety of the array substrate), where the fingerprint collecting units in the fingerprint collecting unit array corresponds to the pixel sub-units in the partial region in a one-to-one manner, in which a<K×m and b<n; or a<K×m and b=n; or a=K×m and b<n, i.e., each pixel sub-unit in the partial region of the array substrate corresponds to one fingerprint collecting unit.

Alternatively, a location at which at least one fingerprint collecting unit is disposed may coincide with the non-TFT region in the corresponding pixel sub-unit.

Figure 4B:
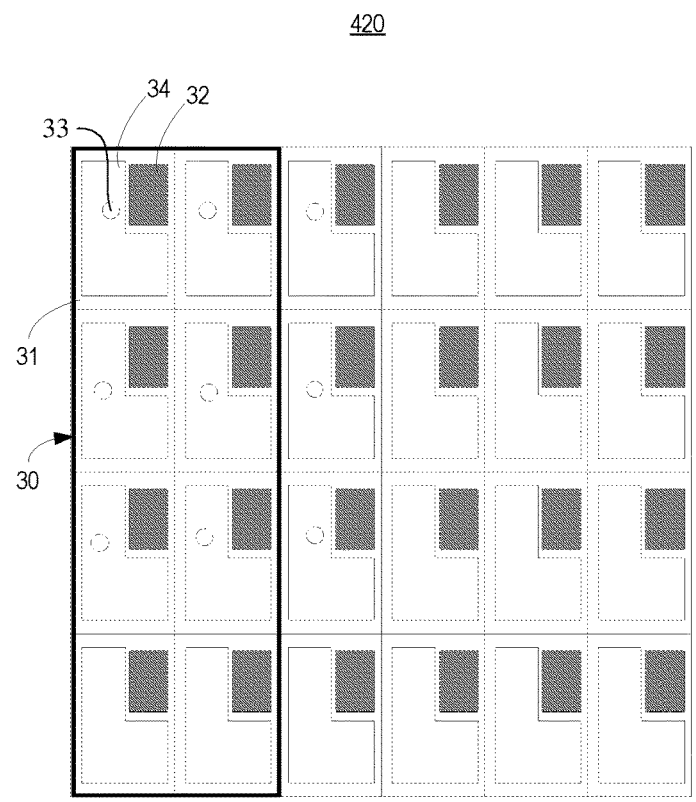
FIG. 4B shows a schematic diagram of an array substrate including a fingerprint collecting unit according to another illustrative embodiment of the present disclosure.

According to embodiments of the second example, the fingerprint collecting unit array may be disposed in an array substrate 420, as shown in FIG. 4B. The array substrate 420 includes 2×4 pixel units 30, i.e., including 24 (8×3) pixel sub-units 31. The array substrate 420 further includes 9 (3×3) total fingerprint collecting units 33. The nine pixel sub-units 31 shown to include a corresponding fingerprint collecting unit 33 may be understood to define the partial region, whereas the remaining regions of the array substrate 420 covering pixel sub-units 31 that do not include a corresponding fingerprint collecting unit 33 may be understood to be outside of the partial region.

According to a third example, fingerprint collecting units may be included in pixel sub-units that are spread across separate portions of the entire region of an array substrate, in which a<K×m and b<n; or a<K×m, b=n; or a=K×m and b<n.

Alternatively, a location at which at least one fingerprint collecting unit is disposed may coincide with the non-TFT region in the corresponding pixel sub-unit.

The fingerprint collecting units may be included in some pixel sub-units in the array substrate of an OLED panel of the present disclosure, i.e., the fingerprint collecting units may be distributed in the entire region of the array substrate evenly. It follows that some pixel sub-units in the array substrate may be provided with one fingerprint collecting unit, while other sub-pixel units in the array substrate may not be provided with the fingerprint collecting unit.

Figure 4C:
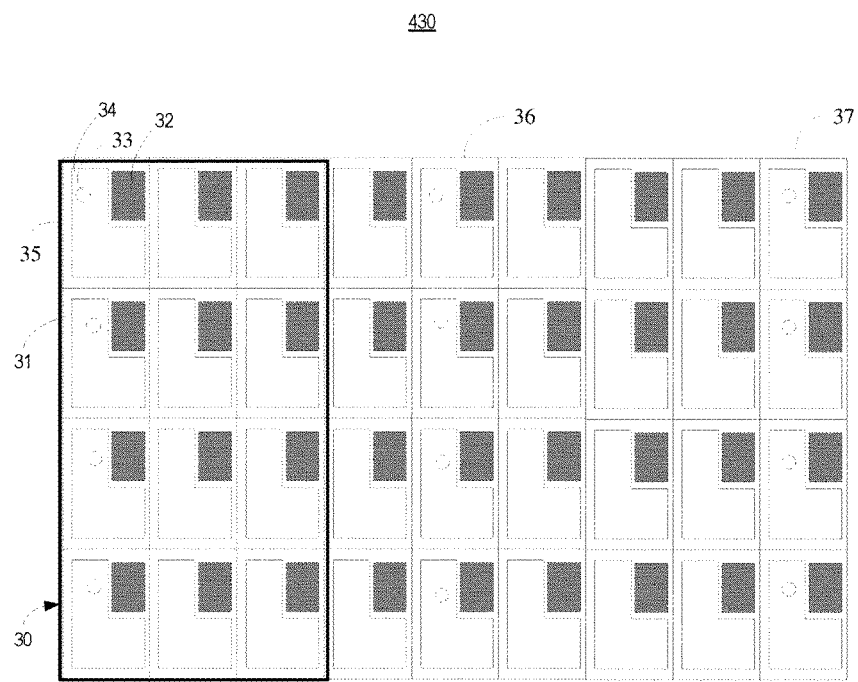
FIG. 4C shows a schematic diagram of an array substrate including a fingerprint collecting unit according to another illustrative embodiment of the present disclosure.

According to embodiments of the third example, the fingerprint collecting unit array may be disposed in an array substrate 430, as shown in FIG. 4C. The array substrate 430 includes 12 (3×4) pixel units 30, i.e., including 36 (12×3) pixel sub-units 31. The array substrate 430 further includes 3×4 fingerprint collecting units 33, i.e., 12 total fingerprint collecting units 33. Taking the first row of the array substrate 430 as an example, a first pixel sub-unit 35 in a first pixel unit from left to right side according to a perspective of viewing FIG. 4C is provided with one fingerprint collecting unit 33, a second pixel sub-unit 36 in a second pixel unit is provided with one fingerprint collecting unit 33, and a third pixel sub-unit 37 in a third pixel unit is provided with one fingerprint collecting unit 33.

Alternatively, the fingerprint collecting unit array may further be disposed between the array substrate and the OLED layer: the position in which the fingerprint collecting unit is present is located above the corresponding pixel sub-unit.

In embodiments where the fingerprint collecting unit array may be disposed between the array substrate and the OLED layer, and the location in which the fingerprint collecting unit is disposed may be located above the corresponding pixel sub-unit, i.e., the position in which the fingerprint collecting unit is disposed may be located above the TFT region in the corresponding pixel sub-unit, or above the non-TFT region in the corresponding pixel sub-unit.

Figure 4D:
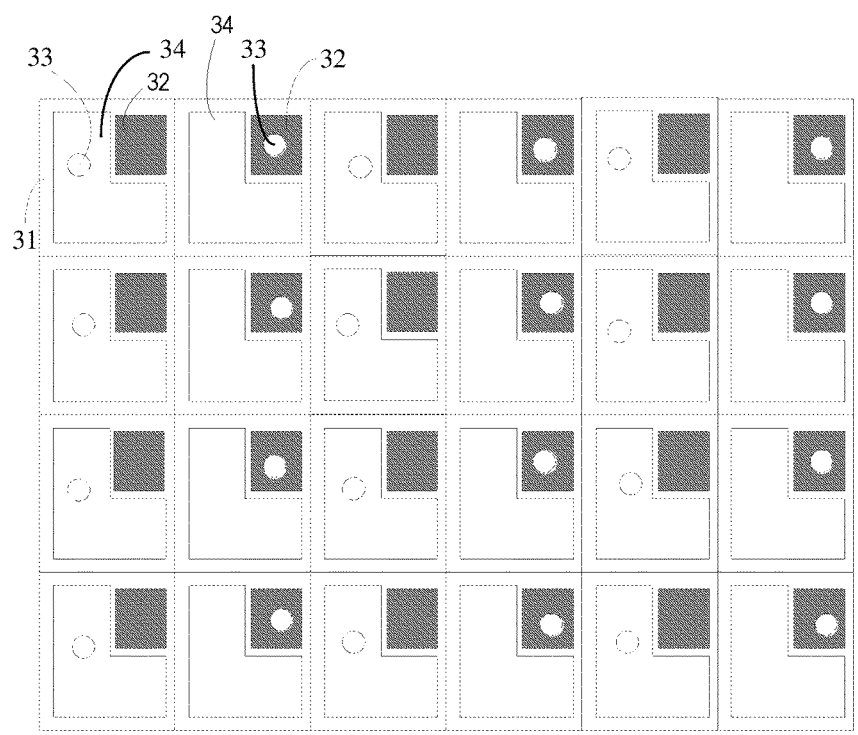
FIG. 4D shows a schematic diagram of an array substrate including a fingerprint collecting unit according to another illustrative embodiment of the present disclosure.

According to embodiments where the fingerprint collecting unit array may be disposed between the array substrate and the OLED layer, FIG. 4D shows an exemplary array substrate 440 according to such embodiments. The array substrate 440 includes some fingerprint collecting units 33 that are disposed to be located above the TFT region 32 in the corresponding pixel sub-unit, and other fingerprint collecting units 33 are disposed to be located above the non-TFT region 34 in the corresponding pixel sub-unit.

It should be noted that FIGS. 4A-4D are merely some examples showing some positions in which the fingerprint collecting unit may be located, it is apparent for those skilled in the art to acquire other positions in which the fingerprint collecting unit is located based on combinations of the above described cases, and other possible arrangements of positions are not limited herein by embodiments of the present disclosure.

Figure 5:
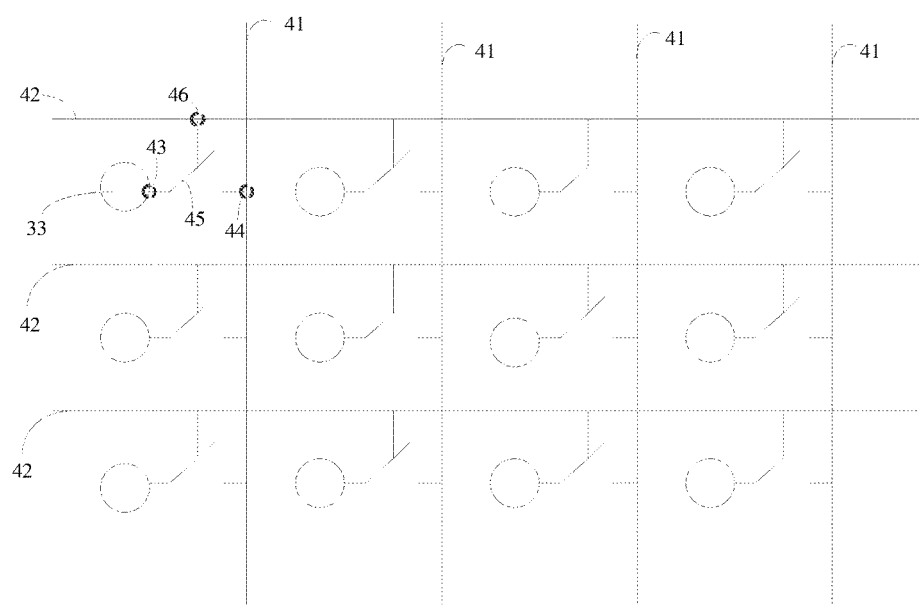
FIG. 5 shows a schematic diagram of a control circuit according to an illustrative embodiment of the present disclosure.

FIG. 5 shows a schematic diagram of an exemplary control circuit 500 connected to a fingerprint collecting unit array according to an exemplary embodiment of an OLED panel of the present disclose. The control circuit includes: a plurality of data lines 41 in a columns and a plurality of control lines 42 in b rows.

Each row of the plurality of control lines 42 may be connected to the plurality of data lines 41 in a columns via switches 45 corresponding to the a columns, respectively. Each switch 45 may include: a control terminal 46 connected to the control line 42; a first connecting terminal 43 connected to the corresponding fingerprint collecting unit 33; and a second connecting terminal 44 connected to the corresponding data line 41.

As shown in FIG. 5, the control circuit may include three rows of the control lines 42, four columns of the data lines 41, and 3×4 fingerprint collecting units, i.e., 12 total fingerprint collecting units. The specific number representative of a or b may be an integer digit, and may be correlated to the size of the corresponding OLED panel, and is otherwise not limited.

The array substrate of the present disclosure may also include: K×m columns of the pixel data lines and n rows of the pixel control lines. The pixel data line and the pixel control line are connected to the pixel sub-unit via a TFT device. A control circuit including the pixel data line and the pixel control line for connecting the TFT in the array substrate is similar to that shown in FIG. 4, which is not elaborated in additional detail herein.

Figure 6:
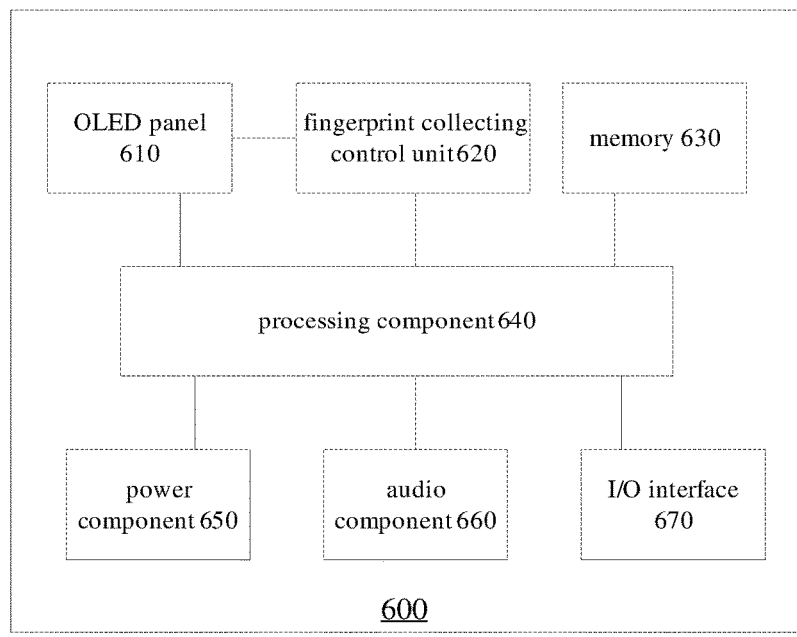
FIG. 6 shows a block diagram of a mobile device according to an illustrative embodiment of the present disclosure.

FIG. 6 shows a block diagram of an exemplary mobile device 600 according to an illustrative embodiment of the present disclosure. As shown in FIG. 6, the mobile device 600 includes an OLED panel 610, a fingerprint collecting control unit 620, a memory 630, a processing component 640, a power component 650, an audio component 660, an input/output (I/O) interface 670.

The OLED panel 610 may be any one of the OLED panels as shown in FIGS. 3A and 3B, provided by the described embodiments, or otherwise described herein.

The fingerprint collecting control unit 620 is connected to a control circuit in the OLED panel 610. The fingerprint collecting control unit 620 is connected to each data line in the control circuit, and further connected to each control line in the control circuit. The control circuit is connected to the fingerprint collecting unit array in the OLED panel 610.

The memory 630 is configured to store various types of data for supporting operations to the mobile device 600. Examples of such data include instructions for any applications or methods operated on the mobile device 600, contact data, phonebook data, messages, pictures, video, etc. The memory 630 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The processing component 640 typically controls overall operations of the mobile device 600, such as the operations associated with display, telephone calls, data communications, camera operations, and recording operations. The processing component 640 may include one or more processors to execute instructions to perform all or part of the processes described herein. Moreover, the processing component 640 may include one or more modules which facilitate the interaction between the processing component 640 and other components. A module may be understood to include software, hardware, firmware, and/or middleware for implementing the features attributed to the module.

The power component 650 provides power to various components of the mobile device 600. The power component 650 may include a power management system, one or more power sources, and any other components associated with the generation, management, and distribution of power in the mobile device 600.

The audio component 660 is configured to output and/or input audio signals. For example, the audio component 660 includes a microphone (MIC) configured to receive an external audio signal when the mobile device 600 is in an operation mode, such as a call mode, a recording mode, and a voice recognition mode. The received audio signal may be further stored in the memory 630. In some embodiments, the audio component 660 further includes a speaker to output audio signals.

The I/O interface 670 provides an interface for the processing component 640 and peripheral interface modules, such as a keyboard, a click wheel, buttons, and the like. The buttons may include, but are not limited to, a home button, a volume button, a starting button, and a locking button.

Figure 7:
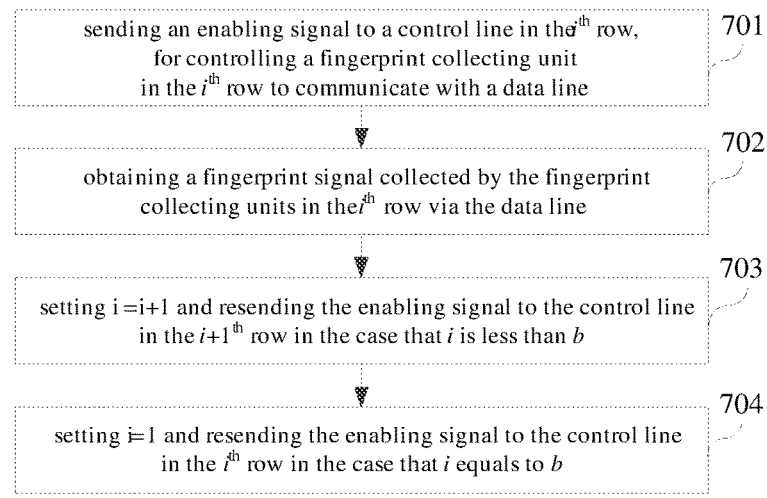
FIG. 7 shows a flow chart of logic for implementing a method for controlling identification according to an illustrative embodiment of the present disclosure.

FIG. 7 shows a flow chart 700 of logic for implementing a method for controlling identification according to an illustrative embodiment of the present disclosure. The method for controlling the identification may be implemented by an exemplary mobile device such as shown in FIG. 6, by controlling a fingerprint collecting control unit to implement processes described by flow chart 700. The method may reference components of control circuit 500 and mobile device 600, and includes the following.

At 701, an enabling signal may be sent to the control line in the $i^{th}$ row, for controlling the fingerprint collecting units in the $i^{th}$ row to communicate with the data line.

The enable signal may be configured to control the fingerprint collecting unit in the $i^{th}$ row to communicate with the data line. The fingerprint collecting control unit may transmit the enabling signal to the control line in the $i^{th}$ row of the control circuit. Based on the received enabling signal, the fingerprint collecting units in the $i^{th}$ row may be communicated with the data line of the control circuit.

For example, as shown in FIG. 5 where the control circuit 500 includes four columns of the data lines 41, three rows of the control lines 42, and four fingerprint collecting units 33 in each row (i.e., 12 fingerprint collecting units 33 in total). When the fingerprint collecting control unit transmits the enabling signal to the control line in the first row, four switches 45 in the first row are all in an ON state and four fingerprint collecting units 33 in the first row are communicated with the corresponded data line 41.

At 702, a fingerprint signal collected by the fingerprint collecting units in the $i^{th}$ row may be obtained via the data line.

The fingerprint collecting control unit may obtain the fingerprint signal collected by the fingerprint collecting units in the $i^{th}$ row via the data line. After collected by the fingerprint collecting units, the fingerprint signal may be transmitted to the fingerprint collecting control unit based on the communication with the data line.

For example, as shown in FIG. 5 where the control circuit 500 includes four columns of the data lines 41, three rows of the control lines 42, and four fingerprint collecting units 33 in each row (i.e., 12 fingerprint collecting units 33 in total). After four fingerprint collecting units 33 in the first row are communicated with the data line 41, the fingerprint collecting control unit may obtain the fingerprint signals collected by four fingerprint collecting units 33 via four columns of the data lines 41.

The fingerprint signal obtained by the fingerprint collecting control unit may be an analog signal. The analog signal may be converted to a digital signal by an analog-digital converter, and the digital signal may be stored in a memory.

At 703, when i is less than b, setting i=i+1, the enabling signal may be re-transmitted to the control line in the $i^{th}$ row.

It is noted that i may represent the row number of the control line; and b may represent the total number of rows. When i is less than b, the fingerprint collecting control unit may transmit the enabling signal to the control line in the $i+1^{th}$ row; and when i=b, step 704 may be implemented.

For example, as shown in FIG. 4 where the control circuit includes eight rows of the control lines. In the case that the fingerprint collecting control unit transmits the enabling signal to the control line in the third row for a predetermined time period, i.e., i=3<8, the enabling signal is transmitted to the control line in the fourth row again until the enabling signal is transmitted to the control line in the eighth row. That is, the fingerprint collecting control unit transmits the enabling signal to the control line row-by-row at intervals of the predetermined time period.

At 704, when i equals to b, the enabling signal may be re-transmitted to the control line in the $i^{th}$ row.

When i equals to b, when i=1, the fingerprint collecting control unit may transmit the enabling signal to the control line in the first row. That is the enabling signal may be transmitted to the control line again from the first row after the fingerprint collecting control unit has transmitted the enabling signal to all rows of the control lines.

Step 701 may be performed again after completing step 704, i.e., steps 701 to 704 may be performed as a loop. When i is of an initial value of 1, the enabling signal may be transmitted to the control lines row-by-row from the first row till the last row, so as to collect the fingerprint signal corresponding to a current frame. Subsequently, the process of transmitting the enabling signal to the control lines row-by-row from the first row to the last row may be repeated as needed, so as to collect the fingerprint signal corresponding to a next frame.

Above all, with the method for controlling the identification provided by embodiments of the present disclosure, the fingerprint colleting control unit transmits the enabling signal to the control lines in the control circuit row-by-row, so that the fingerprint colleting unit in the control circuit may be communicated with the data line; obtains the finger signal via the control line in the ON state; and processes the fingerprint signal, so as to integrate the fingerprint identifying function into the OLED panel, such that a front panel of the terminal may have the displaying function and the fingerprint identifying function at the same time on the same OLED panel, thereby enhancing integral consistency and aesthetics of the mobile device on which the OLED panel is installed.

Currently, the fingerprint is generally identified mainly by a capacitive, ultrasonic or optical way. In the case that the fingerprint is identified by the capacitive way, the fingerprint may be obtained by collecting an image consisting of different values of capacitance resulting from different distances to a contact screen (an electrode) from convex and concave points of an uneven surface of a finger. As interference occurs with a capacitor for collecting the fingerprint when the OLED panel displays a content of the pixel sub-unit, in order to avoid the interference between signals when identifying the fingerprint in the capacitive way, the fingerprint signal may be collected at intervals between displaying the content.

Figure 8:
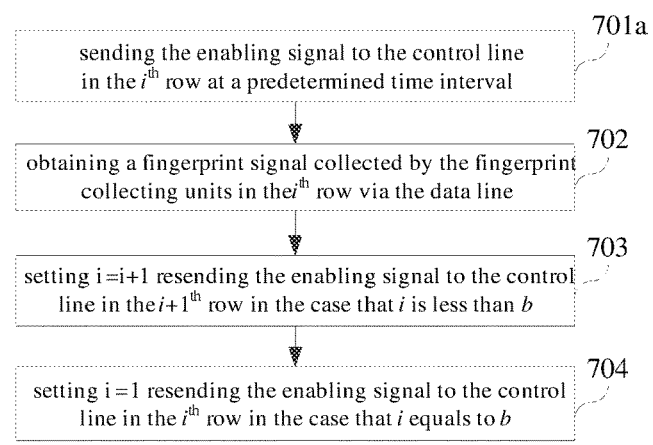
FIG. 8 shows a flow chart of logic for implementing a method for controlling identification according to an illustrative embodiment of the present disclosure.

In the case that the fingerprint is identified by the capacitive way, on the basis of an alternative embodiment as shown in FIG. 7, step 701 may include the following steps as shown by the flow chart 800 of logic in FIG. 8.

At 701a, the enabling signal may be transmitted to the control line in the $i^{th}$ row at a predetermined time interval.

The predetermined time interval may include any one of the three following exemplary time intervals.

1. A time interval between a first time point when the OLED panel refreshes to display a displaying content of the $i^{th}$ frame and a second time point when the OLED panel refreshes to display a displaying content of the $i+1^{th}$ frame, in which i is a positive integer.

There may exist a rest duration subsequent to refreshing to display the displaying content of the $i^{th}$ frame and prior to refreshing to display the displaying content of the $i+1^{th}$ frame by the OLED panel, i.e., a first exemplary time interval. Therefore, the fingerprint collecting unit may collect the fingerprint signal during this first exemplary time interval, so as to achieve the fingerprint identifying function of the panel.

2. A time interval between a third time point when the OLED panel refreshes to display a displaying content of the $i^{th}$ row and a fourth time point when the OLED panel refreshes to display a displaying content of the $i+1^{th}$ row, in which i is a positive integer.

There may exist a rest duration subsequent to refreshing to display the displaying content of the $i^{th}$ frame and prior to refreshing to display the displaying content of the $i+1^{th}$ frame by the OLED panel, i.e., a second exemplary time interval. The fingerprint collecting unit may collect the fingerprint signal during this second exemplary time interval.

3. A time interval between a fifth time point when the OLED panel refreshes to display a displaying content of the $i^{th}$ group and a sixth time point when the OLED panel refreshes to display a displaying content of the $1+1^{th}$ group, in which each group of the displaying content includes successive L rows of the displaying content, i is a positive integer, L is the total number of rows predetermined.

It is predetermined that L rows of the displaying content constituent one group, i.e., the displaying content in the $i^{th}$ group includes successive L rows of the displaying content; and the displaying content in the $i+1^{th}$ group also includes successive L rows of the displaying content.

There may exist a rest duration subsequent to refreshing to display the displaying content of the $i^{th}$ group and prior to refreshing to display the displaying content of the $i+1^{th}$ group by the OLED panel, i.e., a third exemplary time interval. The fingerprint collecting unit may collect the fingerprint signal during this third exemplary time interval.

Above all, with the method for controlling the identification provided by embodiments of the present disclosure, the enabling signal may be transmitted to the control line at the predetermined time interval, so as to avoid interference from occurring with a capacitor of a fingerprint collecting unit collecting a fingerprint when the OLED displays a content of the corresponding pixel sub-unit that overlays with the fingerprint collecting unit collecting the fingerprint, thereby preventing the fingerprint collecting function and the display function from being interfered each other, and thus collecting the fingerprint signal accurately and achieving the fingerprint identifying function on the same OLED panel.

Other embodiments will be apparent to those skilled in the art from consideration of the specification and practice of the features disclosed here. This application is intended to cover any variations, uses, or adaptations of the features following the general principles thereof and including such departures from the present disclosure as come within known or customary practice in the art. It is intended that the specification and examples be considered as illustrative only, with a true scope and spirit of the features being indicated by the following claims.

It will be appreciated that the present features and embodiments are not limited to the exact construction that has been described above and illustrated in the accompanying drawings, and that various modifications and changes can be made without departing form the scope thereof. It is intended that the scope of the features only be limited by the appended claims.

What is claimed is:

1. An organic light emitting display (OLED) panel, comprising:
   an array substrate comprising:
      a plurality of pixel units, each pixel unit comprises a plurality of pixel sub-units;
   an OLED layer disposed on the array substrate;
   a fingerprint collecting unit array disposed in the array substrate or between the array substrate and the OLED layer, the fingerprint collecting unit comprising:
      a plurality of fingerprint collecting units, each fingerprint collecting unit corresponds to a pixel sub-unit in an one-to-one manner;
   a control circuit connected to the fingerprint collecting unit array and configured to control the fingerprint collecting unit array, the control circuit comprising:
      a plurality of data line columns and a plurality of control line rows, each row of the plurality of control line rows connected to the plurality of data line columns via a plurality of respective switches; and
      a control terminal of each switch is connected to a corresponding control line, a first connecting terminal of each switch is connected to a corresponding fingerprint collecting unit, and a second connecting terminal of each switch is connected to a corresponding data line.

2. The OLED panel according to claim 1, wherein each of the plurality of pixel sub-units includes a corresponding fingerprint collecting unit from the plurality of fingerprint collecting units in the fingerprint collecting unit array; or the fingerprint collecting unit array is disposed on a partial region of the array substrate, and each pixel sub-unit located within the partial region includes a corresponding fingerprint collecting unit from the plurality of fingerprint collecting units in the fingerprint collecting unit array.

3. The OLED panel according to claim 1, wherein the fingerprint collecting unit array is disposed on the array substrate;
   each of the pixel sub-unit includes a thin film transistor (TFT) region and a non-TFT region; and
   for a corresponding pixel sub-unit including a corresponding fingerprint collecting unit, the corresponding fingerprint collecting unit is located within a non-TFT region of the corresponding pixel sub-unit.

4. The OLED panel according to claim 1, wherein at least one fingerprint collecting unit is located above a region of a corresponding sub-pixel unit.

\* \* \* \* \*